(12) United States Patent
Rydberg et al.

(10) Patent No.: US 6,524,516 B1
(45) Date of Patent: Feb. 25, 2003

(54) APPARATUS AND A METHOD FOR THE EXTRUSION OF MOULDING FROM A CROSS-LINKABLE POLYMER MATERIAL

(75) Inventors: Jan Rydberg, Älvsjö (SE); Nils-Olof Johnsson, Virsbo (SE); Curt Axelsson, Virsbo (SE); Michael Sjöberg, Virsbo (SE)

(73) Assignee: Wirsbo Burks AB, Virsbo (SE)

( * ) Notice: Subject to any disclaimer, the term of this patent is extended or adjusted under 35 U.S.C. 154(b) by 0 days.

(21) Appl. No.: 09/422,967

(22) Filed: Oct. 22, 1999

(30) Foreign Application Priority Data

Oct. 23, 1998 (SE) ............................................... 9803646

(51) Int. Cl.⁷ ............................................... B29C 47/38
(52) U.S. Cl. .................... 264/476; 264/477; 264/209.6; 264/209.8; 264/211.21; 264/211.24
(58) Field of Search ................................ 264/476, 477, 264/211, 209.6, 209.7, 209.8, 209.2, 211.21, 211.24; 425/378.1, 380, 467

(56) References Cited

U.S. PATENT DOCUMENTS

| | | | |
|---|---|---|---|
| 3,102,303 A | * | 9/1963 | Lainson |
| 3,591,674 A | | 7/1971 | Engel |
| 3,891,372 A | | 6/1975 | Takiura |
| 4,013,276 A | | 3/1977 | Boham et al. |
| 4,409,164 A | * | 10/1983 | Braz et al. |
| 4,595,546 A | | 6/1986 | Wheeler, Jr. |
| 4,797,242 A | | 1/1989 | Fukuda et al. |
| 5,500,172 A | * | 3/1996 | Derezinski et al. |
| 6,106,761 A | * | 8/2000 | Sjoberg et al. |

FOREIGN PATENT DOCUMENTS

| | | |
|---|---|---|
| EP | 0 596 835 | 5/1994 |
| GB | 749079 | 5/1956 |
| GB | 2089717 | 6/1982 |
| WO | 9421441 | 9/1994 |
| WO | 97 10940 | 3/1997 |
| WO | 9737830 | 10/1997 |

OTHER PUBLICATIONS

Patent Abstracts of Japan, Publication No. 62294529, Publication Date Dec. 22, 1987, "Extrusion Molding and Equipment of Thermosetting Resin".

* cited by examiner

*Primary Examiner*—Mark Eashoo
(74) *Attorney, Agent, or Firm*—Browdy and Neimark, P.L.L.C.

(57) ABSTRACT

The present invention relates to apparatus for extruding mouldings from cross-linkable polymer material. The apparatus includes a first part to which the polymer material is delivered from a material container, and a second part which forms a moulding tool for moulding and cross-linking said article. The first part of the apparatus includes a feed zone (2) that has an inlet (8), a generally tubular outlet (7) and a rotatable feed screw (10) that functions to compress and feed the polymer material in a unmelted or solid state from said inlet (8) to said outlet (7), wherein the length of the feed screw (10) does not exceed the length of the feed zone (2).

9 Claims, 3 Drawing Sheets

APPARATUS AND A METHOD FOR THE EXTRUSION OF MOULDING FROM A CROSS-LINKABLE POLYMER MATERIAL

TECHNICAL FIELD OF THE INVENTION

The present invention relates to an apparatus for extrusion of mouldings from cross-linkable polymer material. The apparatus includes a first part to which the polymer material is supplied from a material container, and a second part that constitutes a moulding tool for moulding and cross-linking of said moulding.

The invention also relates to a method for extrusion of mouldings from cross-linkable polymer material in an extruder.

BACKGROUND OF THE INVENTION

Methods for producing moulded articles from cross-linkable polymer material, and particularly for extruding pipes and tubing from polyethylene, are known to the art. Cross-linking, that is, the formation of spatial networks or cross-links in polymers, such as polyethylene, is nowadays generally carried out in accordance with two main principles. According to a first main principle, the so-called silane method, the formation of the spatial network is achieved chemically by means of functional groups, that is, chemically reactive side groups on the polyethylene chain participate in a condensation process which causes cross-links. According to another main principle the cross-linking is achieved by means of radicals that can either be formed by direct action of radiation energy on the polymer chain, for instance by irradiating the polymer chain with UV radiation, IR radiation or with an electron beam, or can be formed by means of additives, cross-linking agents, such as organic peroxides or azo-compounds. In this latter case, the cross-linking reaction is normally triggered by means of heat. The present invention relates to this latter type of cross-linking by means of heat.

Methods based on the transfer of heat from the tool generally have the advantage that all the peroxide will be used since the peroxide does not have time to evaporate. However, very long tools are then needed in order to allow the temperature to be raised in a degree which is sufficient to trigger the cross-linking. A consequence of this is that there is a high pressure drop in the tool, resulting in the necessity of high extrusion pressures, which in turn entails that the extruder must meet high standards. Long channels or passageways also result in frictional problems in the tool.

SE-B-324 450 teaches a method of moulding articles from a polymer that has been mixed with a cross-inking agent, such as an organic peroxide. The mixture is subjected to instantaneous compression in a pressure chamber of a ram-extruder and the compressed rod of material is transferred to a tubular extrusion moulding die for moulding and heating the mixture so as to initiate the cross-linking process. The aforedescribed frictional problems in the tool are a particular drawback in this process. Other drawbacks are that the process is discontinuous and energy demanding, particularly at the spider-leg transition from a material rod to a tubular moulding. This results in that the speed of manufacture will be very low, about 25 kg/h, particularly in the continuous manufacture of products like tubes. Furthermore, weakening welding lines may occur in the finished product, as a result of the spider-leg transition in the process.

Attempts have been made to solve the frictional problem by coating the tool with Teflon®. The tool, however, becomes worn relatively quickly and must therefore be replaced at regular intervals. As described in WO 94/21441, attempts to solve the frictional problem have also been made by co-extruding the cross-linkable material with a thermoplastic surface layer having lower frictional resistance to the surface of the tool. One drawback with this solution, however, is that subsequent to extrusion, it is necessary to remove the co-extruded surface layer if this coating cannot be accepted on the finished product.

Some polymer materials and polymer mixtures, for instance polyethylene, have properties, such as high molecular weights, that make it difficult to process these materials in conventional screw extruders. Conventional screw extruders have long screws with different working zones, which can readily result in excessively high friction-generated temperatures in the extruder. It is therefore necessary to maintain a low speed of manufacture.

Conventional screw extruders comprise almost exclusively screws which feed and also melt and homogenise the material in the extruder through the combined effect of heat introduced through the cylinder wall of the extruder and created by the shearing generated by the screw. In conventional screw extruders a separate extrusion die is usually provided which is adapted to receive and mould the compressed material rod as it leaves the screw extruder. This type of conventional screw extruder also has the aforedescribed drawbacks, i.e. low speed of manufacture and weakenings in the finished product.

It is also known to construct a conventional screw extruder in the aforedescribed manner with the extrusion die forming an extension of the screw, therewith enabling weakening join or weld lines to be avoided in the end product. SE-A-8107529 describes an example of such extruders.

SUMMARY OF THE INVENTION

The object of the present invention is to set forth an apparatus and a method for the extrusion of mouldings from a cross-linkable polymer material and which will enable mouldings, and particularly pipes and tubes, to be extruded at an elevated production rate, including pipes and tubes of small dimensions, and also of good quality, i.e. with a high surface finish, without variations in dimensions, with thermal stability and with the desired degree of cross-linking.

This is achieved in accordance with the invention, with an apparatus of the kind described in the introduction and characterized by having a first part which includes a feed zone provided with an inlet, and a generally tubular outlet, and a rotatable feed screw arranged in the feed zone and functioning to compress and feed the polymer material from said inlet to said outlet with the material in an unmelted state, said feed screw having a length not exceeding the length of the feed zone.

In accordance with the invention, the aforesaid objects are also achieved with a method of the kind described in the introduction and which is characterized in that a feed screw in the feed zone is rotated so that the polymer material is fed and compressed to a tubular shape in the feed zone and therewith generating a pressure increase that is sufficient to feed the polymer material through the moulding tool and in that the polymer material leaves the feed screw in an unmelted state and is fed through the moulding tool in direct connection with the feed zone by the pressure generated.

The feed screw, which is short in relation to conventional feed screws, feeds and compresses the polymer material in an unmelted state in the feed zone such that a maximum increase in pressure is obtained at the exit end of the feed zone where the unmelted polymer material is transferred to the moulding tool. The increase in pressure obtained is sufficient to feed the polymer material through the long moulding tool, which is connected directly to the feed zone and in which the unmelted material is melted, homogenised, moulded and cross-linked.

The length of the moulding tool according to the invention is necessary in order that the polymer material will be sufficiently heated over a period of time which is required for the material to cross-link during its rapid passage, in relation to prior art techniques, through the moulding tool. According to the invention, the polymer material is processed by a moveable processing device in the feed zone, whereafter the polymer material leaves the moveable processing device in an unmelted or solid state and is transferred to the moulding tool and is fed through the die by means of the pressure generated in the feed zone. Thus, the polymer material is influenced solely by said pressure and by the applied heat as it passes through the moulding tool.

The inventive apparatus and inventive method enable the speed of manufacture to be increased by more than 100% and produce mouldings with a quality that is at least as good or even better as the quality of the mouldings produced with prior art techniques. The short feed screw that generates a high pressure in the unmelted material in the outlet end of the feed zone and the continuous advancement of the material in the process contributes to the higher rate of feed.

In one preferred embodiment of the invention, an extension of the core of the moulding tool extends through the feed screw. This is advantageous due to the fact that the core of the mould tool can be supported without spider legs, which increases the process rate and also enhances the quality of the finished article. This construction also enables that the relatively large pressure forces, occurring especially at high speed of manufacturing, are taken up by firmly securing the core extension.

Other advantageous embodiments are set forth in the following description of exemplifying embodiments and in the independent claims.

SHORT DESCRIPTION OF THE ATTACHED DRAWINGS

The invention will now be described in more detail with reference to the accompanying drawings, in which FIG. 1 is an overview which illustrates a first part of one embodiment of the inventive apparatus for the manufacture of extruded plastic pipes or tubes, said apparatus being shown from one side and partly in cross-section;

FIG. 5 is an enlarged cross-sectional part-view of an alternative bearing of the inner shaft and the core of the FIG. 2 embodiment.

DETAILED DESCRIPTION OF PREFERRED EMBODIMENTS OF THE INVENTION

Figure 1:
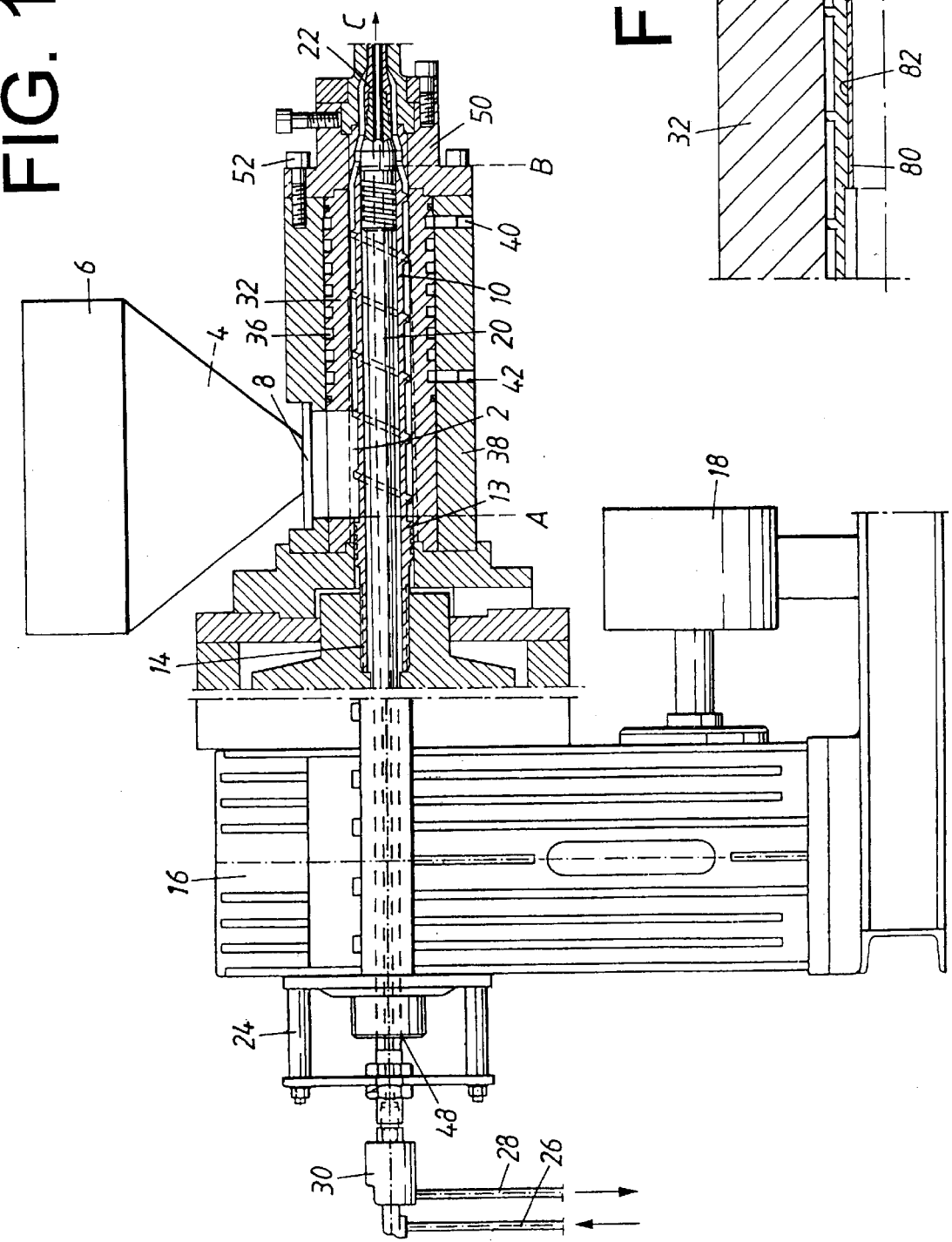
Figure 2:
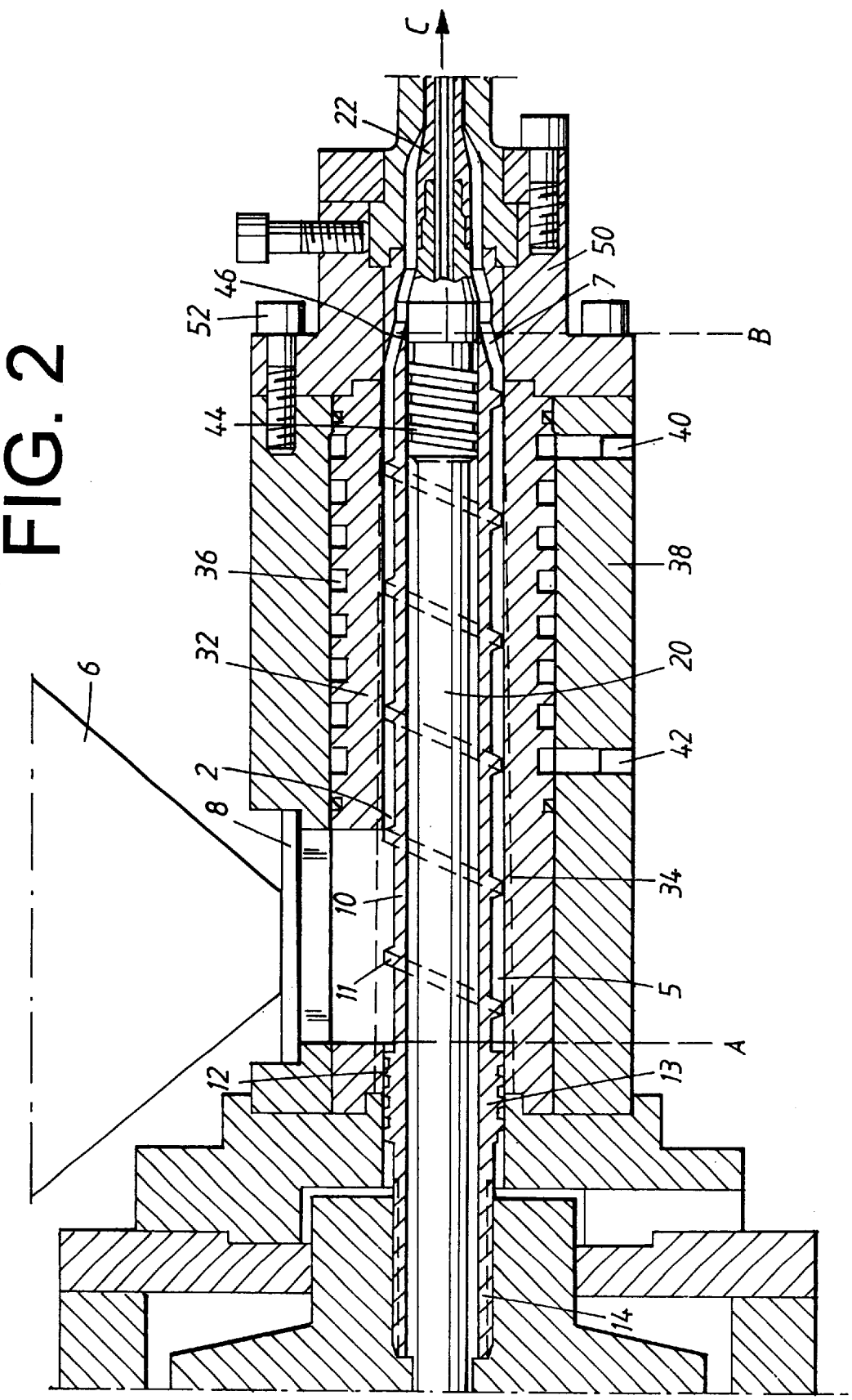
FIG. 2 is an enlarged cross-sectional view of the feed zone shown in FIG. 1.
Figure 3:
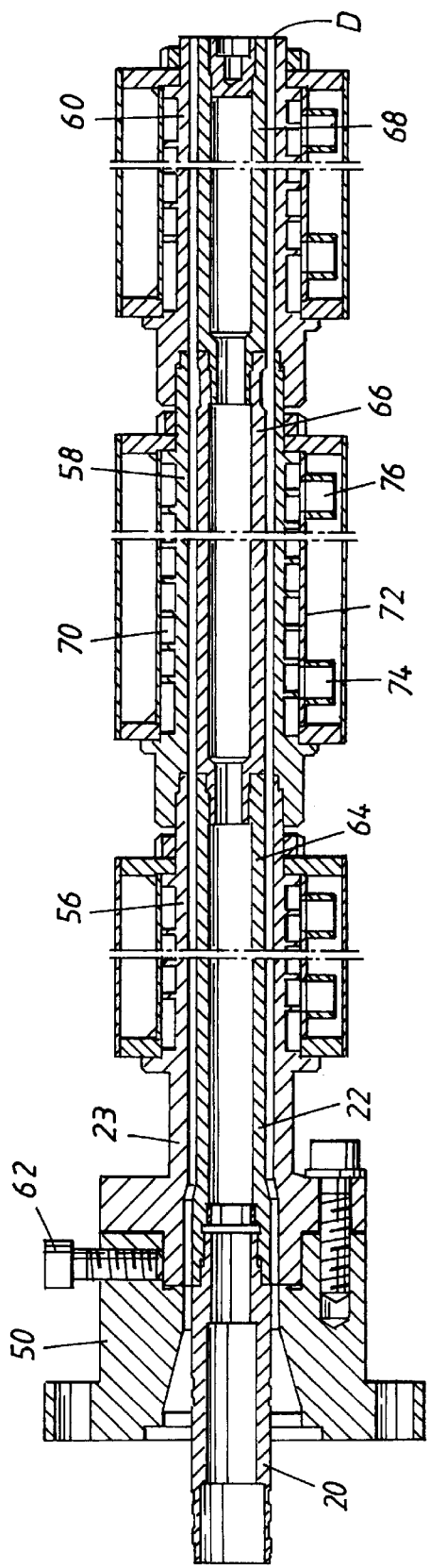
FIG. 3 is a longitudinal cross-sectional view of a second part of one embodiment of the inventive apparatus, said second part forming an extension of the first part as shown in FIG. 1.
Figure 4:
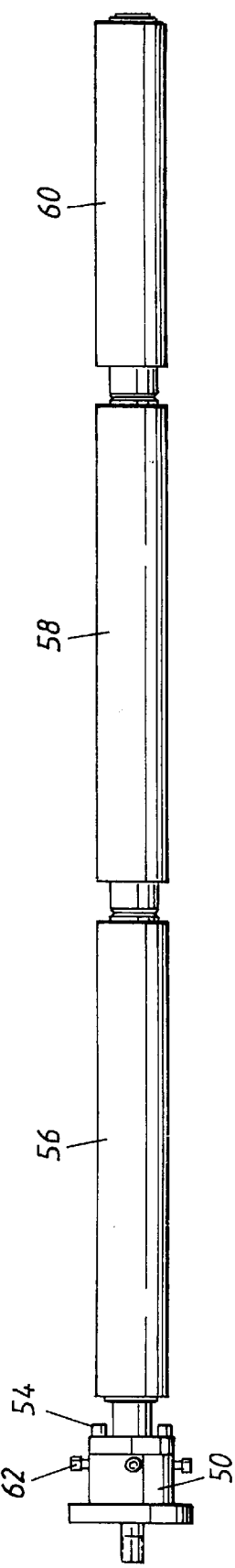
FIG. 4 is a side view of the second part of the extruder as shown in FIG. 3.

FIGS. 1 and 2 illustrate a first part of a preferred embodiment of an extruder according to the invention. The second part of the extruder is shown in FIGS. 3 and 4 and forms an extension of said first part.

As shown in FIG. 1, the first part of the extruder includes feed zone 2 into which a ready-mix material to be extruded 4 is fed from a hopper 6, as described in more detail here below. The term feed zone is defined in extruder technology, to which the invention refers, as that part of an extruder in which the material to be extruded is fed and compressed in a fully unmelted or solid state, optionally with the aid of applied cooling.

The material to be extruded is a polymer material, for instance a polyolefin, preferably polyethylene, which has been mixed with an antioxidant and a peroxide as a cross-linking agent. The amount of antioxidant in the material to be extruded is about 0.1 percent by weight and functions to prevent thermal degradation of the plastic in the extruder at elevated temperatures, or when using the extruded pipe or tube as, for instance, a water-carrying conduit. The cross-linking agent may be an organic peroxide, preferably a non-polar peroxide accepted in foodstuff contexts. However, polar peroxides and azo-compounds may also be used in applications that need not satisfy foodstuff handling requirements. Optional polymer materials and cross-linking agents that may be used are discussed in more detail in SE-B-324 450, for instance, to which reference is now made. The material to be extruded or the polymer material 4, may, of course, consist of other material or material mixtures within the scope of the invention.

The material to be extruded or the polymer material 4, is fed gravitationally from the hopper 6 through a preferably rectangular inlet opening 8 and into the feed zone 2. A moveable feeder 10 is provided in the feed zone 2. The moveable feeder 10 is comprised of a rotatable feed screw. The feed screw 10 and its feed thread 11 extend from the rear part A of the feed zone to the front part B of said zone, as seen in the direction of feed C. In the illustrated embodiment, the feed screw 10 is provided with a single feed thread 11, although it may, of course, have some other thread design within the scope of the invention. The feed screw may, for instance, have a double thread with an angular displacement of 180°.

The feed screw 11 runs in a feed passage 5 that includes the inlet opening 8 and also a tubular outlet 7 which opens into the second part of the extruder, as described in more detail here below. The feed screw has a length/diameter ratio (1/d) between 3–6, preferably about 5. This ratio of the feed screw dimensions according to the invention may be compared with corresponding 1/d values of conventional screw extruders, which are between 24–30.

The feed screw 10 has an extension 13 arranged at the rear part A, this extension 13 being provided in a first part with an external thread 12 having a pitch direction which, as the screw 10 rotates, counteracts or prevents the polymer material being fed in the wrong direction at the inlet opening 8, i.e. in a direction opposite to the feed direction C. The end 14 of the extension 13 is provided with splines for connecting the feed device 10 to a gearbox 16 and a drive motor 18 for rotating said feed device 10 (see FIG. 1).

The feeder or feed screw 10 is hollow and an inner shaft or core 20 runs in the inner cavity of the screw. The front end of the shaft 20 is connected to and holds a core 22 provided in the second part of the extruder, i.e. the moulding tool, as described in more detail below. The rear end of the shaft 20 extends through the gearbox 16 and to the opposite side of said gearbox, where it is firmly fixed to a backplate 24. In turn, the backplate 24 is firmly anchored in the construction, so as to be able to take-up the whole of the axially acting force or thrust occurring in the core 22 and on the inner shaft 20 during the extrusion process.

The shaft 20 and the core 22 are both hollow and have internally passageways (not shown) for conducting a hot medium, such as hot oil, for instance. Hot oil used to heat the core 22 is delivered to the interior of the shaft 20 through an inlet conduit 26 and is returned through an outlet conduit 28. A swivel device 30 distributes and feeds the oil to the core 22.

The rotatable feed screw 10 in the feed zone 2 is housed in an feed tube 32 that includes longitudinally extending feed channels 34 disposed around the feed screw in the inner cylindrical surface of the feed tube, said channels being shown in broken lines in FIGS. 1 and 2. The feed channels 34 extend along the full length of the feed zone 2, i.e. from A to B, and decrease successively in depth in the feed direction C, such as to have their greatest depth at A and to have zero depth at B.

The feed channels 34 may have a rectangular cross-sectional shape, although they may alternatively have other appropriate cross-sectional shapes, such as part-circular shapes, for instance. In the case of the illustrated embodiment, the feed channels 34 extend axially in the cylindrical surface of the feed tube 32, although they may alternatively extend helically in said surface within the scope of the invention.

The presence of these feed channels prevents the major part of the polymer material from accompanying the screw as it rotates. Consequently, the material will, instead, be moved in the feed direction more effectively than would be the case if the cylindrical surface of the feed tube were to be completely smooth. The presence of the feed channels also increases the feed rate and cause a higher pressure to be built-up in the feed passageway 5. When the polymer material reaches the position B, at which the feed channels have zero depth, it will have been fully compressed and a maximum pressure will have built-up at the terminal position of the feed zone. In this stage of the process, the feed passageway 5 is completely filled with unmelted or solid material and the pressure in the feed passageway will have increased to a level at which it can overcome the resistance against advancement of the material through the moulding tool.

In order to prevent the feed zone from being heated to excessively high temperatures, the feed tube 32 is provided externally with helical cooling channels 36 for cooling the feed zone 2. In the illustrated embodiment, the feed zone may be water-cooled. The cooling water, which may suitably have a temperature of about 35° C., is passed to the cooling channels 36 via an inlet opening 40 in an external tube 38 that surrounds the feed tube, and is returned via the outlet opening 42 in the outer tube 38, after the cooling process. The heat generated by friction in the feed zone is led away by the cooling water, and the polymer material will therefore be completely unmelted or solid after having been fed through the feed zone to the outlet 7. When the polymer mixture contains an antioxidant, the temperature in the feed zone 2 should not exceed the melting point of the antioxidant, for instance 50° C.

As described above, the shaft 20 is joined to the core 22 of the moulding tool and forms an extension of said core. The shaft 20 is provided with an external thread 44 at the front end of the feed screw 10. The thread has a pitch direction which, as the feed screw rotates, causes polymer material to be fed between the rotating feed screw 10 and the stationary shaft 20 in a direction opposite to the feed direction C, therewith forming a thin film 46. The gap between the shaft and the feed screw is about 0.1 mm and the film 46 prevents metal-to-metal contact between the firmly anchored shaft and the opposing end of the rotating feed screw 10. A small amount of material will thus continuously flow in a backward direction (the opposite direction to the feed direction C) along the outside of the shaft 20, this material being drained-off in the backplate 24 at the position 48 in FIG. 1. The continuously formed film of material 46 thus fulfils a very important function, namely that of providing a bearing that supports the core 22 of the moulding tool and the core extension.

As mentioned in the introduction, when practising known techniques, weakening weld lines occur in the extruded pipe or tube, due to the use of the spider-leg transition between the first and the second part of the tool. According to the present invention, the moulding tool. can be fastened directly to said first part, as shown in FIGS. 1–2, in the absence of a spider-leg transition. This is shown more clearly in FIGS. 3–4. As will be seen from FIGS. 1–4, a ring-shaped flange or adapter 50 is fastened to the outer tube 38 of the feed zone by means of screws 52. The moulding tool, i.e. the moulding, melting and cross-linking tool, is fastened to the first part of the apparatus by means of the adapter 50.

FIG. 4 is a side view of the moulding tool, which includes essentially the adapter 50, an inner core 22 connected to the shaft 20, and an outer barrel 23 connected to the adapter 50.

The barrel 23 includes a first barrel 56 which is fastened to the adapter 50 by means of barrel screws 54, and further includes two additional barrels 58, 60, i.e. a second and a third barrel. The adapter 50 has a number of radially extending adjustment screws 62 which enable the position of the first barrel 56 to be adjusted so as to obtain the desired pipe measurements in the moulding tool.

The shaft 20 extends into the adapter 50, as shown in FIG. 3. The shaft 20 passes into and is firmly connected with a first core 64 which runs in the barrel 56. The first core 64 is firmly connected to an intermediate core 66 which runs in the second barrel 58 and is firmly connected to a third core 68 which runs in the third barrel 60. There is formed between the barrels 56, 58, 60 and the inner core 64, 66, 68 a cavity into which polymer material fed from the feed zone 2 is processed, i.e. moulded, melted and cross-linked during the extrusion process. The inner surface of the barrel 56, 58, 60 and/or the outer surface of the core 64, 66, 68, i.e. the surfaces defining the moulding cavity, may conveniently be coated with a friction-inhibiting material, for instance Teflon®, to a thickness of 10–50 μm, in order to reduce frictional resistance in the tool.

Melting and cross-linking of the polymer material is achieved by heating the tool core 22 and the tool barrel 23 with the aid of a hot medium, such as hot oil, having a temperature of about 250° C., for instance. The hot oil is passed from the inlet conduit 26 (see FIG. 1) through the shaft 20 and into the hollow core 64, 66, 68 in internal channels (not shown in the drawings), and is then discharged through the outlet conduit 28. Hot oil is also passed through respective inlet and outlet openings 74, 76 to channels 70 in the barrel 56, 58, 60 in order to heat the barrel. The channels 70 are surrounded by insulating layers 72 in order to reduce heat losses in the tool.

In accordance with the inventive method, pipe sections or profiles are produced from cross-linkable polymer material which preferably comprises a mixture of polyethylene powder, antioxidant and peroxide. The ready-mix material is fed gravitationally from the hopper 6 through the feed opening 8 and into the feed zone 2. Rotary movement of the feed screw 10 and the successively decreasing depth of the feed channels 34 coact to provide uniform outfeed from the feed zone, at high speed and high pressure. A pressure maximum is obtained at the end of the feed zone, at the point B, at which the feed channels 34 have zero depth and at which the end of the screw is located. This pressure is sufficient to overcome oppositely acting forces generated in the moulding and cross-linking tool.

The polymer material is cooled in the feed zone 2 by means of a water coolant that passes through the cooling channels such that the temperature of the material in the feed zone will preferably not exceed about 50° C. The material is completely unmelted or solid when it leaves the feed zone at the outlet 7. The small leakage flow obtained by means of the thread 44 of the shaft, between the front part of the rotating feed screw 10 and the internal shaft 20, forms a film of material 46 that acts as a bearing and supports the shaft and the core.

The unmelted or solid material which leaves the feed zone 2 under maximum pressure is fed to and shaped in the moulding cavity in the adapter 50 and then pressed in the feed direction C, between the core 64, 66, 68 and the barrel 56, 58, 60 in the moulding tool. The polymer material is heated in the tool with the aid of oil heated to a temperature of about 250° C. and is shaped dimensionally, melted, homogenised and cross-linked to form a finished, cross-linked pipe or tube that leaves the tool at point D. The pressure forces and feed forces occurring in the core and shaft of the tool are effectively taken-up by the firmly anchored backplate 24.

The finished pipe, also including pipes of small dimensions, leaves the tool at a speed which is considerably higher than the speed in conventional moulding processes. A typical production rate when practising the inventive method is about 60 kg/h in the case of pipes of small dimensions and about 150 kg/h in the case of pipes of bigger dimensions, although even higher speeds can be achieved under certain conditions. In accordance with the invention, the moulded articles are produced in a continuous stream. in the absence of spider-leg transitions. The moulded articles are therefore homogenous, have narrow tolerances, a high surface finish and are stronger.

A problem may occur in the case of pipes of bigger dimensions, owing to the fact that the tool must have a length which is sufficient for cross-linking, i.e. to enable the thick wall of the pipe to be heated sufficiently during its passage through the tool. In the case of coarse pipe dimensions, this may require a tool of unmanageable length. The present invention solves this problem with an alternative method in which the coarse pipe is cross-linked solely on the outer parts of the pipe wall as the pipe passes through the tool, whereafter the remainder of the cross-linking process in the pipe wall is effected in a following process by the means of infrared. radiation, as described more clearly in WO 97/10936 to which reference is now made.

FIG. 5 illustrates an alternative bearing of the shaft 20 in the front end of the feed screw 10. FIG. 5 illustrates only a part of the immediately surroundings of the front end of the feed screw, which in other respects coincides with FIG. 2. In the case of the FIG. 5 embodiment, the outer cylindrical surface of the shaft 20 is smooth and completely lacks the external thread 44 of the FIG. 2 embodiment. In this alternative embodiment, the thin, constantly flowing film of material 46 of the FIG. 2 embodiment has been replaced with a slide bearing 80, preferably a self-lubricating bearing, which has been pressed into a bearing seat 82 provided in the inner surface of the feed screw 10. It will be understood that the slide bearing 80 may be placed in some other position within the scope of the invention, for instance in a bearing seat provided in the outer cylindrical surface of the shaft 20.

In the case of the illustrated embodiments, the feed screw is rotated on a firmly anchored and stationary shaft. According to another preferred embodiment of the invention (not shown), the shaft is instead fastened in the rotary feed screw so that the shaft and the tool core will rotate together with the feed screw.

It will be understood that the aforedescribed and illustrated preferred embodiments of the invention are solely non-limiting examples and that these embodiments may be varied in many ways within the scope of the accompanying claims. For instance, the polymer material to be extruded used in the inventive method may be in pellet or granular form, as an alternative to the aforementioned powder form. The outer cylindrical surface of the feed tube may be completely smooth, i.e. completely lack the feed channels, or may be provided with feed channels that extend only along a part of said cylindrical surface. The hot oil used for heating purposes may be replaced with other types of heating media. Moreover, solely given parts of the moulding tool need be heated to the requisite temperature. The tool core and/or the tool barrel may be heated electrically instead of with a liquid heating medium. Cooling of the feed zone may be totally excluded and the coolant used may be some other suitable liquid or gas as an alternative to water.

What is claimed is:

1. A method of extruding mouldings from cross-linkable polymer material in an extruder that includes a first part which forms a feed zone that includes a feed passage (5) to which polymer material is delivered, and a second part which forms a tool for moulding and cross-linking said moulding, characterised in that a feed screw (10) in the feed zone (2) is rotated so as to feed the polymer material in a feed direction (C) and to compress the polymer material to a tubular state in the feed zone (2) by rotation of the feed screw (10) and a successively decreasing cross-sectional area of the feed passage (5) and therewith generate a pressure increase that is sufficiently high to feed the polymer material through the moulding tool, that the polymer material leaves the feed screw (10) in a solid or unmelted state and is fed through the moulding tool in direct connection with the feed zone (2) by said generated pressure, and that a film (46) of unmelted polymer material is fed in a direction opposite to the feed direction (C), between a front end part (B) of the feed screw and an internal stationary shaft (20) that forms an extension of a tool core (22) that is supported by the film.

2. A method according to claim 1, characterised in that the polymer material in the feed zone (2) is cooled, preferably to a temperature that does not exceed about 50° C.

3. A method according to claim 1, characterised in that said moulding is moulded, melted, homogenised and cross-linked in the moulding tool in direct connection with the feed zone (2).

4. A method according to claim 1, characterised in that said moulding is moulded, melted, homogenised and partially cross-linked in the moulding tool in direct connection with the feed zone (2) and is finally cross-linked in a subsequent cross-linking process by means of infrared radiation.

5. A method according to claim 4, chasacterised in that the moulding tool is heated by supplying heating medium to the tool core (22) and/or the tool barrel (23), so that the cross-linkable polymer material is moulded, melted and cross-linked in the moulding tool by means of the heat supplied.

6. A method according to claim 5, characterised in that the moulding tool is heated to a temperature of about 250° C.

7. A method according to claim 1, characterised in that the polymer material is polyethylene.

8. A method according to claim 7, characterised in that the cross-linkable polymer material includes a cross-linking agent in the form of organic peroxide.

9. A method according to claim 8, characterised in that the cross-linkable polymer material includes an antioxidant.

* * * * *